Figure 3:
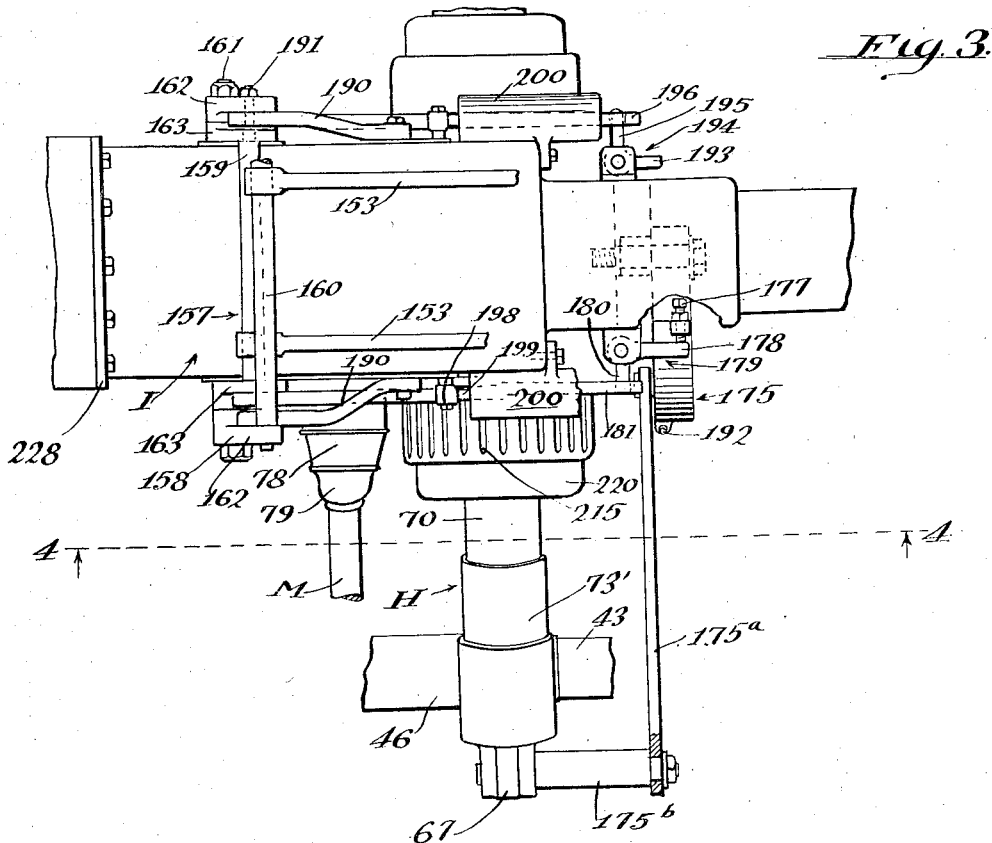

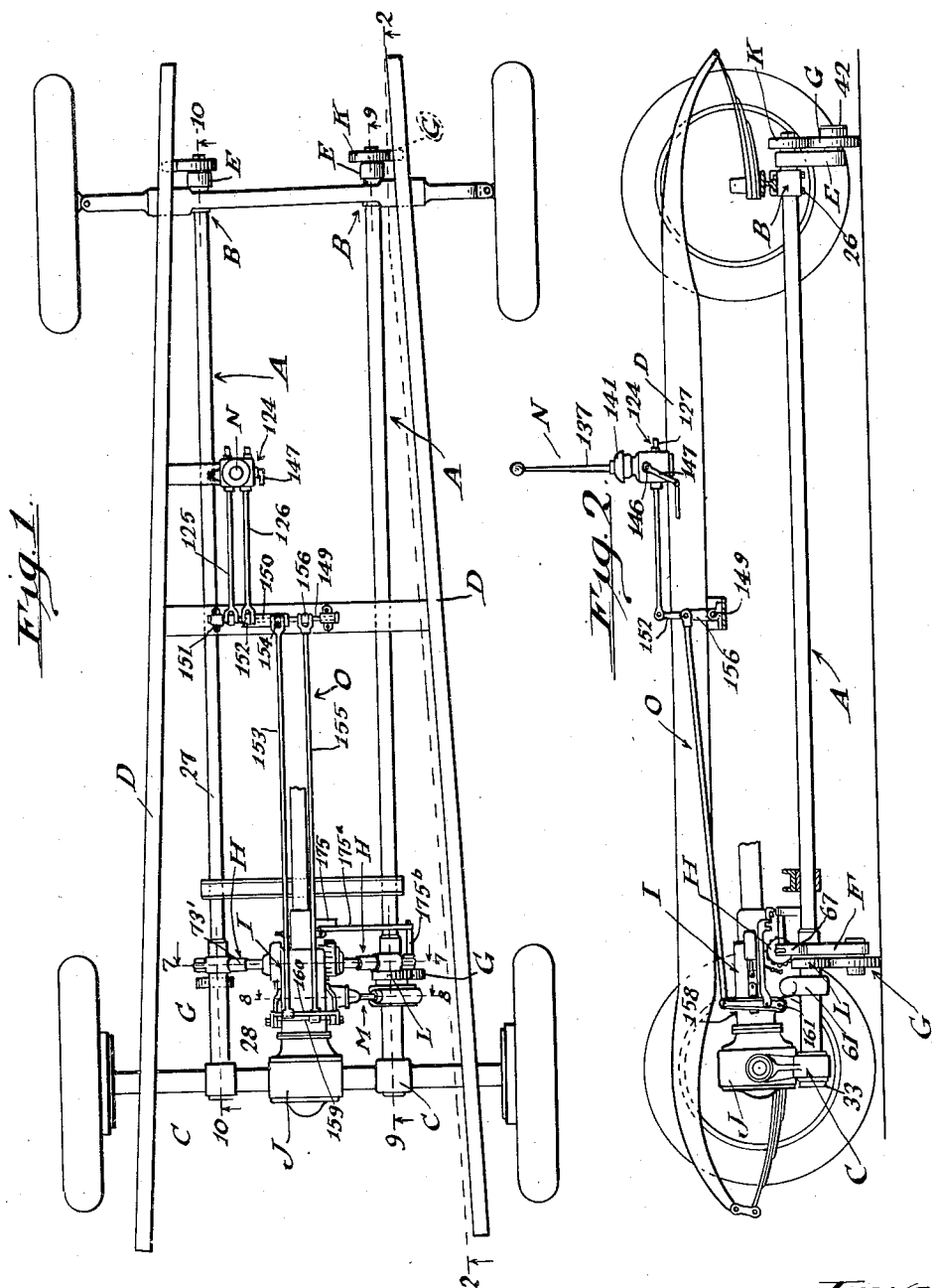

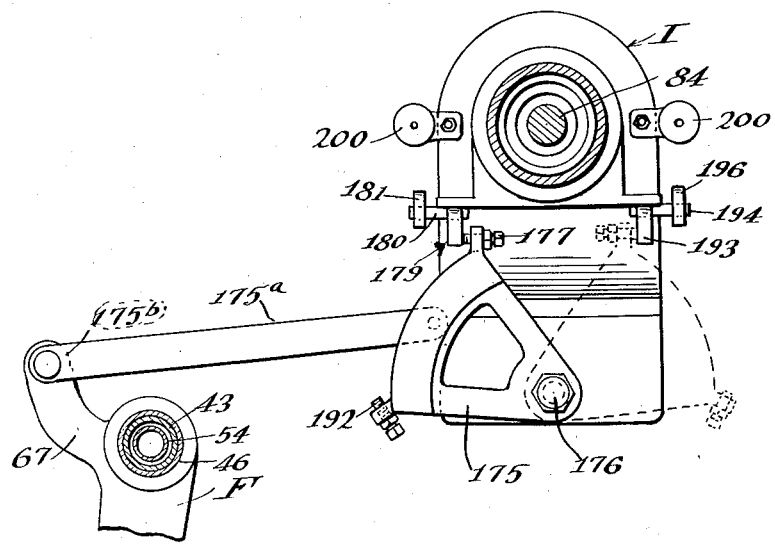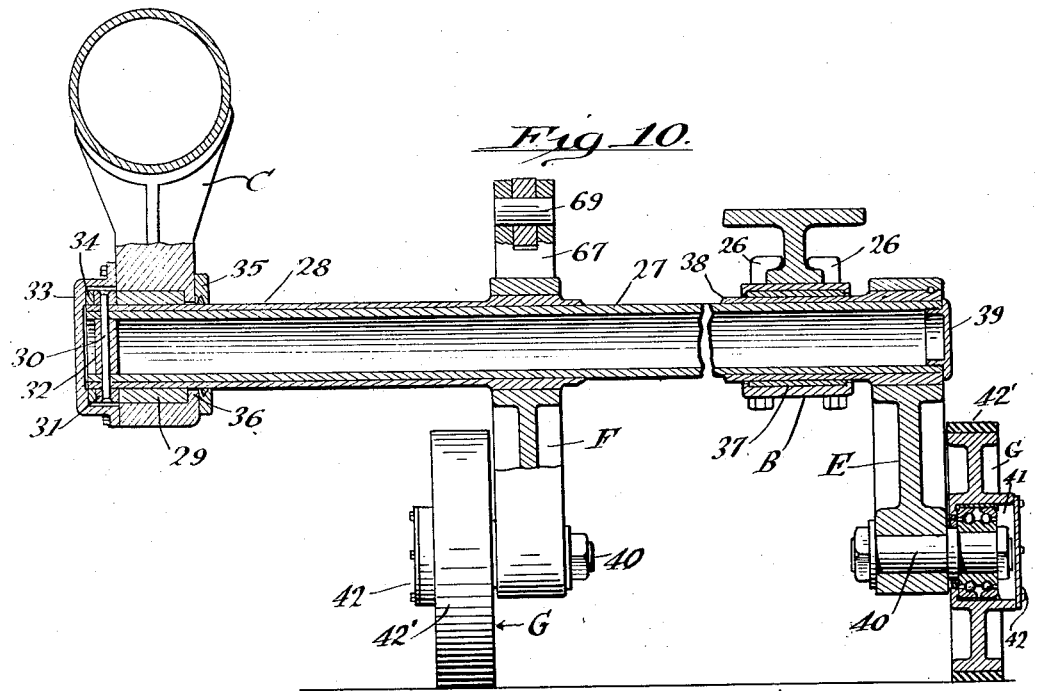

June 3, 1930.  G. W. WOOLLEY  1,761,554
PARKING DEVICE FOR MOTOR VEHICLES
Filed Aug. 29, 1928   7 Sheets-Sheet 4
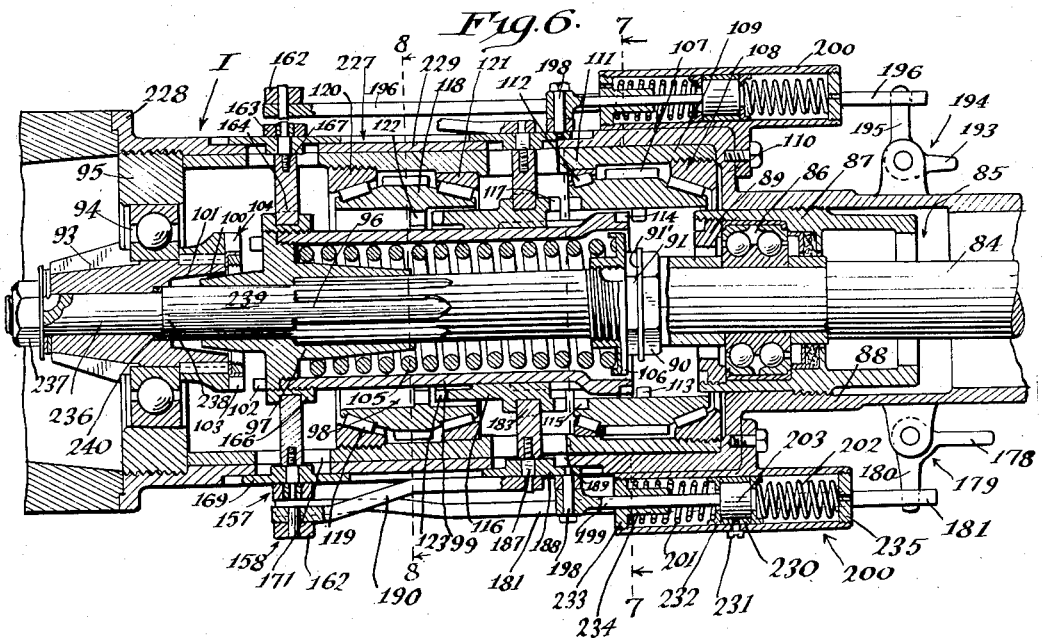
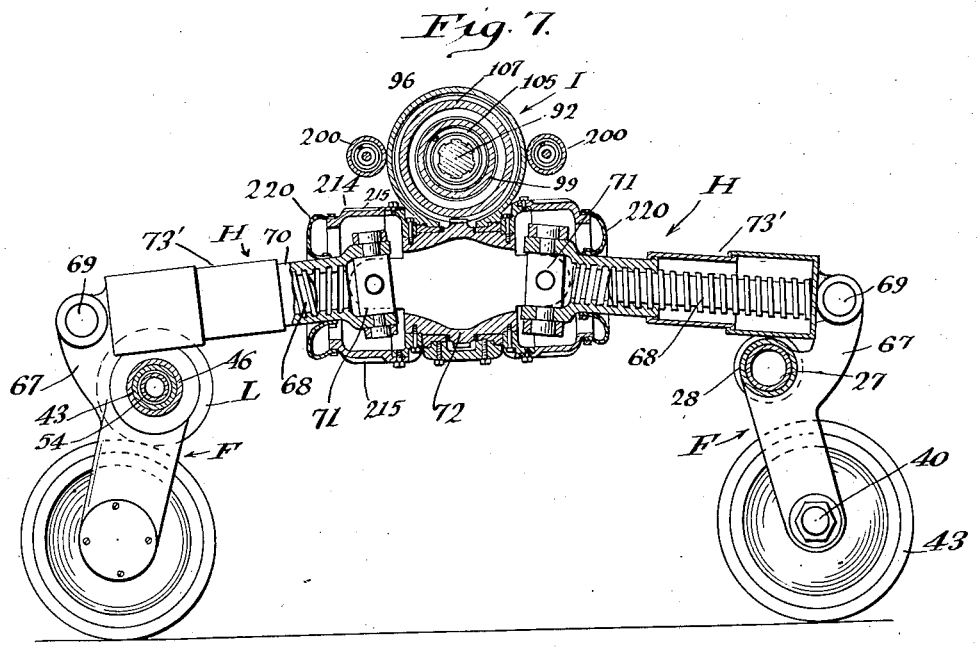
Inventor
George W. Woolley
by Hazard and Miller
Attorneys June 3, 1930.  G. W. WOOLLEY  1,761,554
PARKING DEVICE FOR MOTOR VEHICLES
Filed Aug. 29, 1928  7 Sheets-Sheet 5
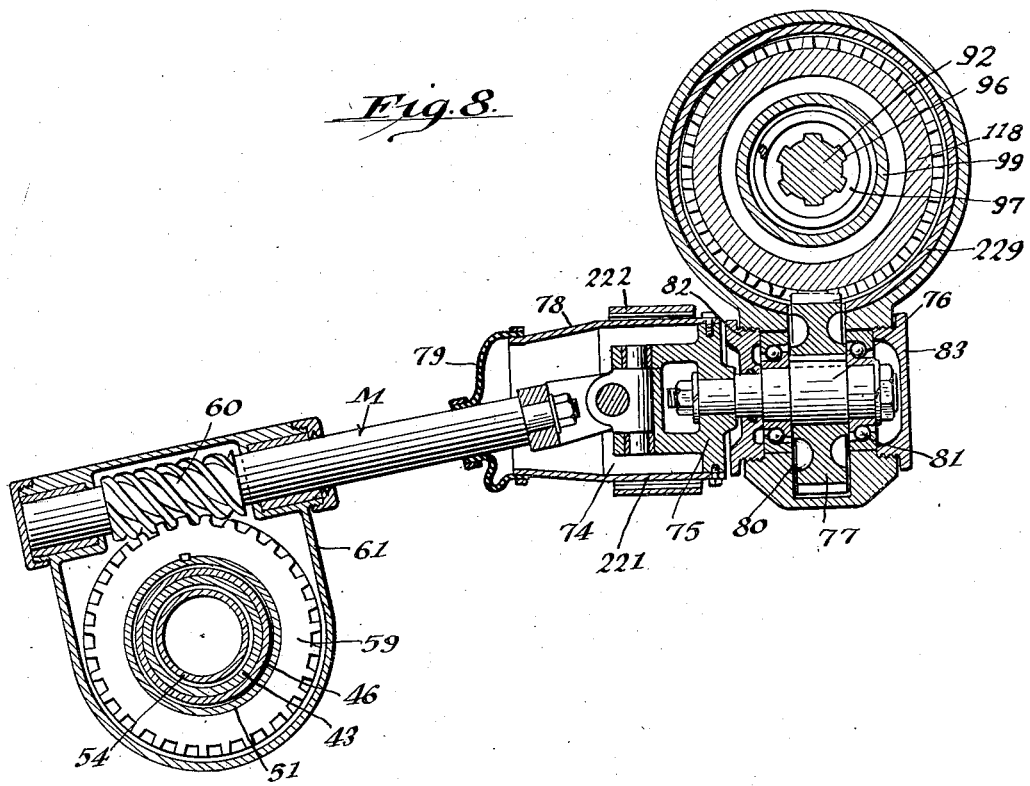
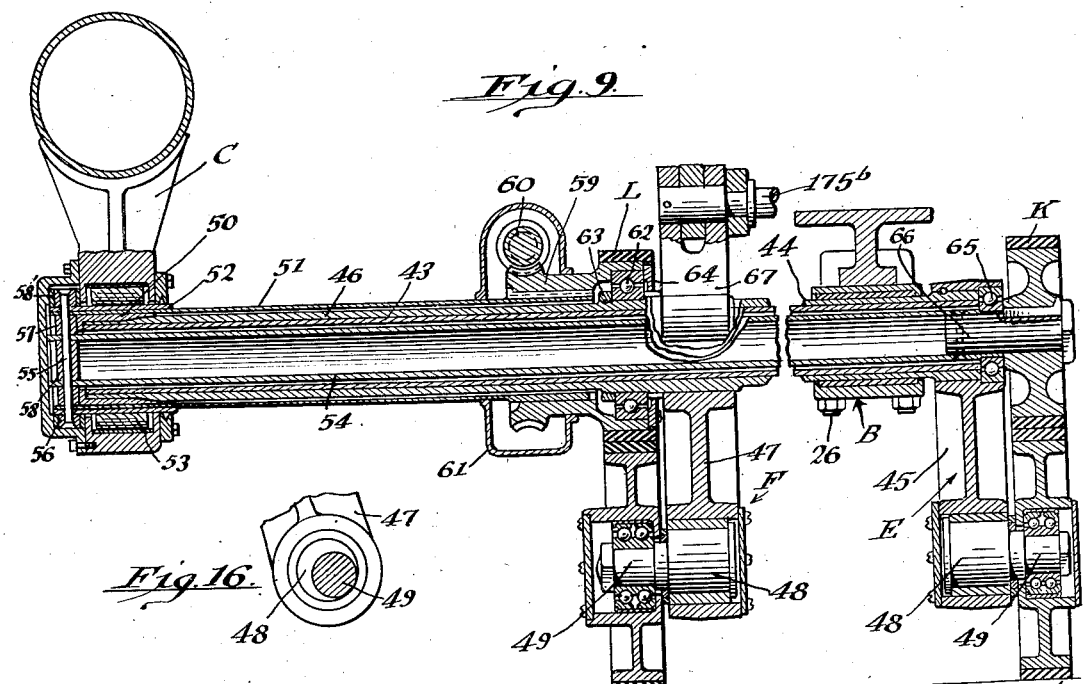

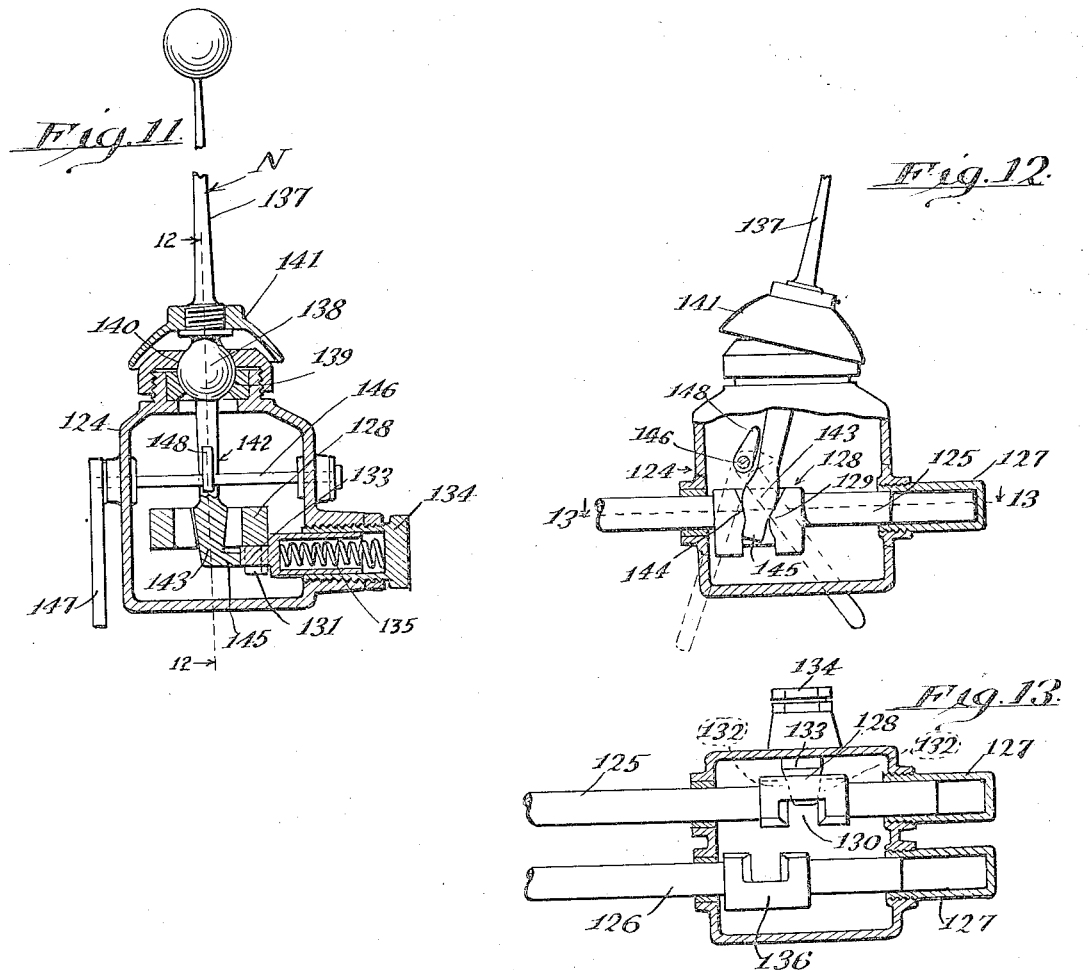
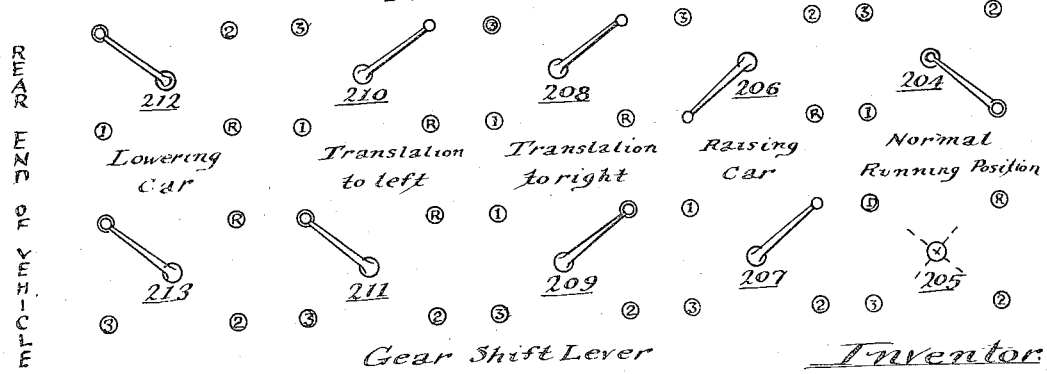

June 3, 1930.  G. W. WOOLLEY  1,761,554
PARKING DEVICE FOR MOTOR VEHICLES
Filed Aug. 29, 1928   7 Sheets-Sheet 7
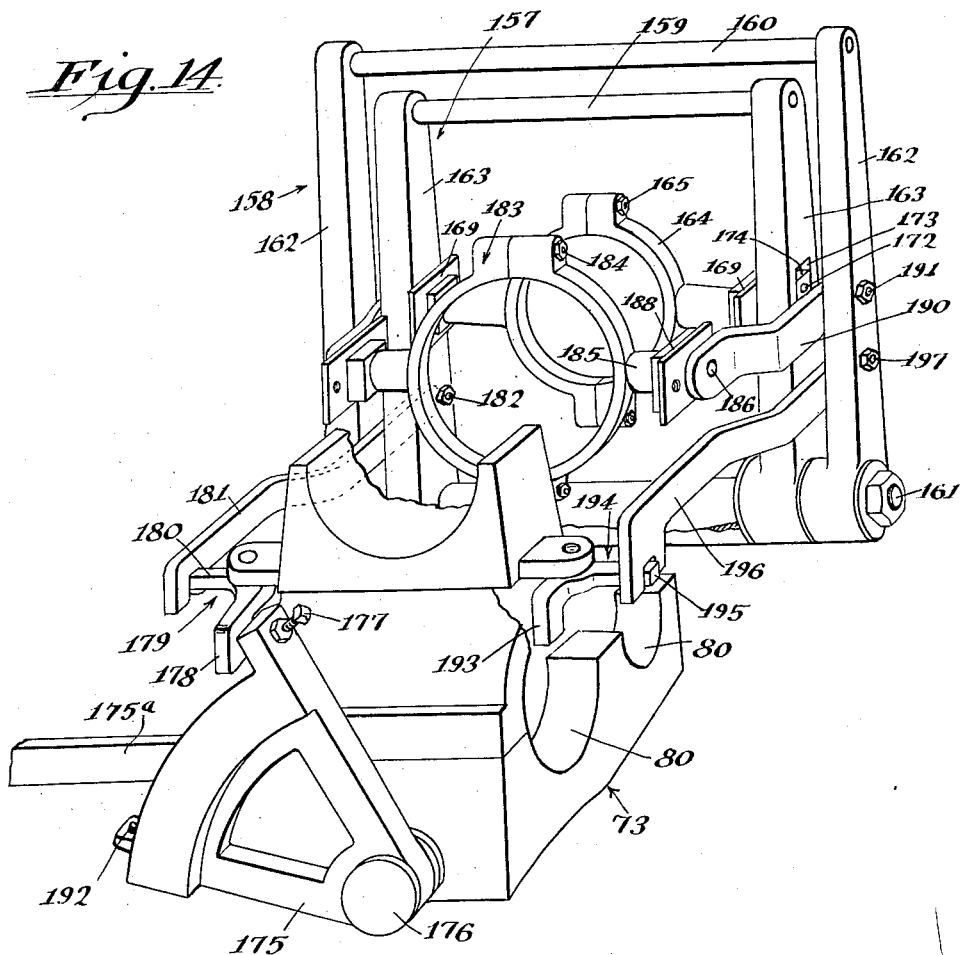

Patented June 3, 1930

1,761,554

UNITED STATES PATENT OFFICE

GEORGE W. WOOLLEY, OF PASADENA, CALIFORNIA

PARKING DEVICE FOR MOTOR VEHICLES

Application filed August 29, 1928. Serial No. 302,702.

My invention is a parking device for motor vehicles by which the vehicle may be raised off the running wheels and supported on transverse parking wheels. These wheels may then be driven to move the vehicle to the curb, if desired, and then the vehicle may be lowered or left in the elevated position. The vehicle may be moved outwardly from the curb by driving the parking wheels and then lowered onto the regular running wheels.

My present invention may be considered a further development of, or an improvement over my patent application, Serial No. 220,247, for a parking gear for motor vehicles, filed September 17, 1927; and an object of my present invention may be considered as improvements in design and simplicity of mechanism over that of my application above mentioned.

In such patent application the propeller shaft of the vehicle, preferably driven by the ordinary motor and controlled by the ordinary gear shifting mechanism or a speed regulation mechanism, was utilized to manipulate the parking wheels for raising and lowering the vehicle and also to furnish power for moving the vehicle laterally. By this type of mechanism the power of the engine may be utilized for all manipulations of the device.

Some of the objects of my present invention involve the use of a pair of torsion tubes positioned on opposite sides of the center line of the vehicle and mounted on the front and rear axles, these torsion tubes having legs secured thereto with parking wheels journaled on the legs, the axles of the parking wheels being longitudinal of the vehicle. The legs of the rear pair of parking wheels are connected by a screw jack type of device with a gear mounted in the central gear housing hung from the propeller shaft or the forward part of the differential housing of the vehicle. This gear meshes with a gear which may be connected to the propeller shaft by a clutch so that in the rotation of the propeller shaft in one direction the parking wheels are lowered and the vehicle raised to its limit, and in a reverse motion the parking wheels are elevated and the screw jack device threaded inwardly, this being done by the interconnection of the raising and lowering gear with the propeller shaft.

Another detail object of my invention in this connection is the control of the clutch connecting the raising and lowering gear with the propeller shaft whereby when the vehicle is fully elevated the clutch is thrown out so that no power is transmitted through the raising and lowering gear, and also when the parking wheels are fully elevated such transmission of power is cut off. Therefore, it is immaterial whether the operator shut off the vehicle power when the vehicle is fully elevated or lowered onto the running wheels.

Another main object of my present invention is driving of the parking wheels by a friction drive to shift the vehicle laterally, such friction drive being by engagement of a friction wheel with the tread of the parking wheels, the parking wheels being preferably rubber tired and the friction wheel also having a ruber tire. To effect this operation I have a transmission gearing suspended from the propeller shaft housing or from the forward end of the differential housing and this drives a worm shaft by a universal joint gearing with a worm mounted on the exterior of one of the torsion tubes on one side of the vehicle. A friction wheel is rotatably mounted on the outside of this torsion tube preferably adjacent the rear axle, and this communicates a drive to the parking wheel at the rear of the vehicle by a friction drive. The drive to the forward friction wheel preferably forward of the front axle is by means of a drive shaft journaled within the torsion tube. This has a connection by means of a rotary external sleeve with the worm drive from the transmission gearing, such sleeve being mounted in journals suspended from the rear axel housing and forming a rear suspension for the torsion tube. I find it is only necessary to drive a parking wheel at the front and rear of a vehicle to effect the lateral translation.

The transmission gearing for the lateral movement of the vehicle is operated by the propeller shaft of the vehicle through the medium of the gear which may be connected thereto by a suitable clutch mechanism, this clutch mechanism being operated by a manipulator lever hereunder detailed. By the operation of this manipulator lever and the transmission clutch the power from the propeller shaft may move the vehicle to the right or to the left.

Another detail object of my invention is in the connection of the main clutch of my parking device to the small beveled gear or worm used to drive the differential. This has a tapered cone connection so that the jaws of the clutch do not have any direct thrust thereagainst; and I utilize thrust bearings adjacent the small differential gear and also at the forward end of the parking device main clutch to take the thrust of forward and reverse motion.

Another object of my invention is controlling the parking device by the joint action of the ordinary gear shift lever and my manipulator lever. This manipulator lever is designed to have a motion somewhat similar to that of the gear shift lever and by operating such lever the clutch connecting the raising and lowering gears may be connected to the propeller shaft to raise the vehicle and then the clutch for the power transmission for the lateral motion may be connected to the propeller shaft, and the power drive may be obtained by use of the ordinary gear shift with the ordinary transmission of the vehicle.

Figure 4:
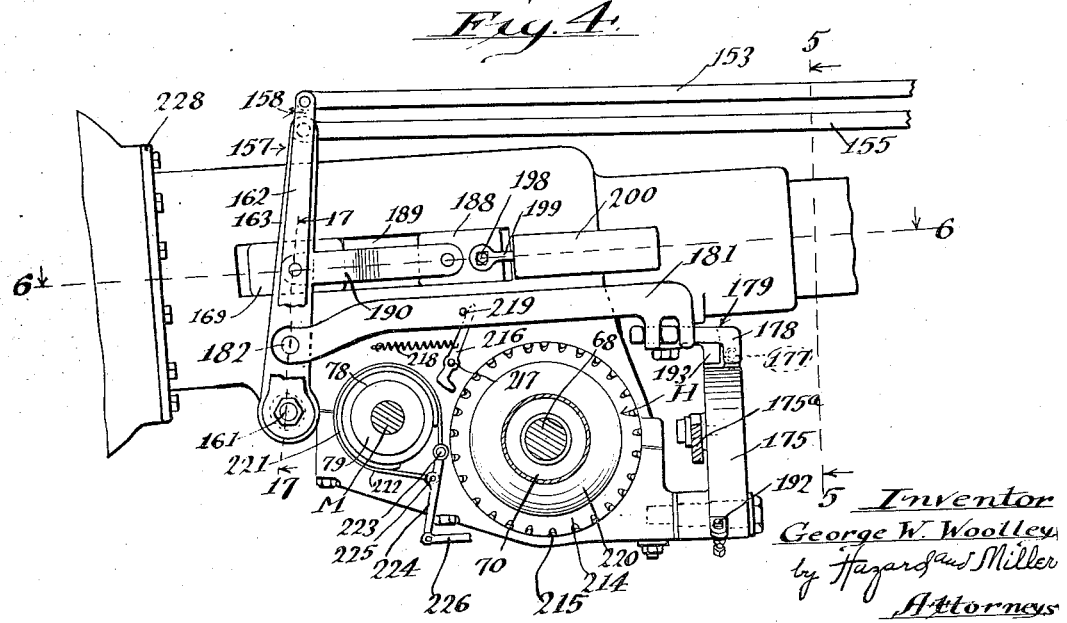

Further improvements and details of construction will be apparent from the fuller description in connection with the drawings, my invention being illustrated in the accompanying drawings, of which:

Fig. 1 is a plan showing the chassis of an automobile with my invention installed thereon, Fig. 2 is a longitudinal section on the line 2—2 of Fig. 1 in the direction of the arrows, Fig. 3 is an enlarged plan showing the main portion of the housing attached to or forming an extension of the rear axle differential, Fig. 4 is a longitudinal section on the line 4—4 of Fig. 3 in the direction of the arrows, showing the main portion of the housing in side elevation, certain portions being broken away, Fig. 5 is a vertical transverse section on the line 5—5 of Fig. 4 in the direction of the arrows, Fig. 6 is a longitudinal horizontal section taken substantially on the line 6—6 of Fig. 4 in the direction of the arrows, Fig. 7 is a vertical transverse section taken substantially on the line 7—7 of Fig. 1 in the direction of the arrows, and showing certain parts on the line 7—7 of Fig. 6 in the direction of the arrows, Fig. 8 is a vertical transverse section substantially on the line 8—8 of Fig. 1 in the direction of the arrows, showing certain parts of the central housing substantially on the line 8—8 of Fig. 6 in the direction of the arrows, Fig. 9 is a vertical longitudinal section on the line 9—9 of Fig. 1 in the direction of the arrows, showing the parking wheels in engagement with the ground and the friction drive therefor, Fig. 10 is a vertical longitudinal section on the line 10—10 of Fig. 1 in the direction of the arrows showing the opposite set of parking wheels which have no direct drive, Fig. 11 is a vertical transverse section of the manipulator lever housing for controlling the clutches to transmit power to raise and lower the vehicle and to move such vehicle laterally, Fig. 12 is a vertical longitudinal section on the line 12—12 of Fig. 11 in the direction of the arrows, showing the lever and certain other parts in elevation, Fig. 13 is a horizontal section on the line 13—13 of Fig. 12 in the direction of the arrows, showing the clutch operating rods in plan, Fig. 14 is a perspective view looking from the front of a portion of the mounting suspended from the forward extension of the differential housing, Fig. 15 is a diagram showing the relative positions of the vehicle gear shift lever and the manipulating clutch operating lever, Fig. 16 is a detail perspective view of one of the eccentric hubs and axle for the mounting of the driven transverse parking wheels, Fig. 17 is a fragmentary section view taken on the line 17—17 of Fig. 4.

The general layout of my invention is substantially as follows, having reference particularly to Figs. 1 and 2: The torsion tubes are designated generally by the letter A suspended at the front by hangers B from the front axle and at the rear end by hangers C from the rear axle housing. There are two of these tubes each positioned close to the outside longitudinal frame bar D of the vehicle. Each of these tubes carry at the front a leg E and at the rear a leg F, each of these legs having a transverse parking wheel G secured thereto. The torsion tubes are connected by a screw jack type of device H with a clutch and gear mechanism in the main clutch and gear case I which is illustrated as forming a forward extension of the differential housing J. There are friction wheels K and L bearing on the transverse parking wheels on the right-hand side of the vehicle, these friction wheels being concentric to the torsion tubes and actuated by a transverse shaft M connecting to a gear having an operative clutch in the main clutch and gear case I. A manipulator lever N is mounted in a suitable place on the vehicle and is connected by a system of clutch operating links O which operate the clutches in the clutch and gear case I. The vehicle also has the ordinary mechanism for shifting the gears in the vehicle transmission for different speeds of driving ahead and for reverse. To avoid confusion such latter mechanism is not illustrated.

The general operation of the mechanism so far described is substantially as follows: By proper operation of the manipulator lever N the clutches may be operated so that the propeller shaft is disconnected from a driving connection with the pinion or worm used for operating the differential whereby the rear axle is rotated. And in a further operation of this lever one of the clutches is actuated connecting the propeller shaft with the screw jack device which operates on the torsion tubes and partially rotates said tubes, operating the legs E and F so that the wheels G raise the vehicle's running wheels off the ground. These parking wheels in their elevated position are housed extending outwardly and are drawn downwardly and inwardly towards the center of the vehicle in their accurate path, raising the vehicle and passing slightly inwardly towards a vertical position so as to be, to a certain extent, locked by the weight of the vehicle. A throwout clutch to be hereunder detailed, automatically disengages the raising and lowering clutch when the vehicle is fully elevated and when the parking wheels are fully elevated for the ordinary running of the vehicle. In order to derive power for operating the propeller shaft from the engine it is necessary to use the ordinary gear shift lever of the vehicle, or for vehicles which are electric or steam driven to operate the propeller shaft at the desired speed and in the desired direction for the above transmission of power.

When the vehicle is fully elevated a further manipulation of the manipulating lever N operates another clutch in the clutch and gear case I which causes the rotation of the transverse shaft M through a system of gearing, and this latter actuates the friction wheels K and L as set forth in detail hereunder, these friction wheels having a contact with the tread of the parking wheels and thus the vehicle may be moved transversely to the left or the right, the power from the propeller shaft being derived by using the ordinary gear shift lever of the vehicle transmission or other suitable manner to derive power from the engine or motor of the vehicle. The operator is required to stop the transverse movement when the desired position is reached such as against the curb or outward therefrom in a position for ordinary travel. I find it satisfactory to effect the transverse movement by driving only two of the parking wheels on one side.

The mounting of the torsion tubes in detail is substantially as follows, having reference particularly to Figs. 7, 8, 9 and 10:

The hanger B is illustrated as a simple tubular type, having hook-shaped clamping bolts 26 secured to the lower flange of the front axle. The torsion tube on the left hand side illustrated particularly in Fig. 10 is designated by the detail number 27 and has a reinforcing sleeve 28 shrunk thereon at the rear end, this being journaled in the hanger C depending from the rear axle housing. This hanger has a bushing 29 therein and rearward of the bushing there is a pin 30 connecting through thrust collar 31 and a central plug 32. A cap 33 forms a closure at the rear end and has a thrust washer 34 therein. A suitable packing gland with packing 35 forms a grease tight closure at the forward end of the bearing bushing 29, the hanger having an inwardly turned flange 36. At the forward end the hanger B has a bushing 37 therein which operates on the reinforcing sleeve 38 secured on the outside of the torsion tube 27, the forward end of this tube being closed by a plug 39.

The forward leg E is secured on the outside of the sleeve 38 in any suitable manner and has an axle 40 secured in its lower end, this axle carrying the wheel G, this having antifriction bearings 41 closed in by a cover plate 42. The wheel is illustrated as having a rubber tread 42'. The rear leg F is secured on the outside of the sleeve 28 in any suitable manner and carries the parking wheel G in a manner similar to that of the forward parking wheel.

On the right hand side the construction and mounting of the torsion tube are somewhat more complicated and are illustrated in particular in Fig. 9. In this case on account of differences of construction the torsion tube is designated 43, and at the forward end has a sleeve 44 thereon journaled in the hanger B. The forward leg on account of differences of construction is designated 45, this being secured to the forward end of the sleeve 44. In the rear portion the torsion tube has a sleeve 46 on which is mounted the rear leg which on account of differences of construction is designated 47. The legs 45 and 47 have eccentric hubs 48 therein, set out in detail hereunder, and each of these hubs has an axle 49 on which are mounted the parking wheels with antifriction bearings in a manner similar to that shown in Fig. 10.

The rear mounting for the torsion tube on the right hand side and the drive for the friction wheels is substantially as follows, referring particularly to Figs. 8 and 9: At the rear end of the sleeve 46 and the torsion tube 43 there is a bushing 50, and outside of this bushing there is a drive sleeve 51 having a reinforcing sleeve 52 thereon. This sleeve is engaged by the roller bearings 53 mounted in the hanger C depending from the rear axle housing, this roller bearing causing t slight difference for the hanger on the right hand side from that on the left hand side of the vehicle. A tubular drive shaft 54 extends centrally through the torsion tube 43 from the rear end to the front end and is connected by a pin 55 passing through a thrust collar 56 on the outside of the sleeve 52 and through an annular plug 57 between the drive sleeve 51 and the tubular shaft 54 and also through the central plug 58 in the drive shaft 54. Thus on the rotation of the drive sleeve 51 the shaft 54 is rotated. The rear end of the torsion tube is closed in by a cap having a thrust washer 58' in a manner similar to that shown in Fig. 10.

A worm gear 59 is keyed on the forward end of the drive sleeve 51 and engages a worm 60 on the transverse shaft M. There is a gear housing 61 suspended from this shaft. The gear 60 is directly connected to the rear friction wheel L illustrated as having a rubber tire and having an antifriction bearing 62 between the inner portion of the wheel and the sleeve 46. This bearing is held in place by a nut 63 and a plate 64. The rubber periphery of the friction wheel engages the rubber tire of the rear parking wheel so that on rotation of the transverse shaft M in a manner hereunder detailed the rear parking wheel on the right hand side is rotated. The forward end of the tubular shaft 54 has an antifriction bearing 65 centering this shaft in the torsion tube 43 and the sleeve 44. A plug 66 is secured in the forward end of the shaft 54 and this carries the forward friction wheel K which also has a rubber on its periphery engaging with the forward parking wheel G on the right hand side; and as the shaft 54 rotates with the gear 59 both of the friction wheels operate to transmit a lateral driving force on the parking wheels on the right hand side of the vehicle. The operation of the torsion tubes to raise and lower the parking wheels is substantially as follows, having reference particularly to Figs. 3, 4, 7 and 14: Each of the legs F on the right and left hand side of the vehicle is provided with lateral extensions 67 having the screw jack device H connected thereto. This screw jack has a screw 68 connected by a pin 69 to each of the extensions 67, and each screw threads into a nut 70 mounted on a universal joint structure 71, the fixed portion of the joint being attached to a central helical gear 72 which is journaled in a central hanger 73 (Fig. 14) depending from the clutch and gear case I. The detailed description of this hanger and of the gear is given hereunder. There is a telescopic dust cover 73' fitting over the screw 68 and the nut 70. The drive for the transverse shaft M for the transverse movement of the vehicle on the parking wheels is as follows, having reference particularly to Figs. 3, 4, 8 and 14: The shaft M has a universal joint 74. This has a horizontally rotating section 75 mounted on the stud shaft 76 journaled in the hanger 73; and on this shaft there is a helical gear 77. A dust cover 78 is secured to the section 75 and has a flexible covering end 79 which engages the shaft M. The shaft 76 is centered in the opening 80 of the hanger 73 by the antifriction bearings 81, these latter being securely positioned by the closure nuts 82 and 83.

The main clutches and gearing housed in the clutch and gear case I are constructed substantially as follows, having reference particularly to Figs. 3, 4, 6, 7 and 8: The main propeller shaft 84 of the vehicle passes through an opening in the forward end 85 of the clutch and gear case I and is journaled in a forward set of antifriction thrust bearings 86 held in a cage 87 mounted in the forward portion 88 of the case I. This bearing is maintained in place by a nut 89. A nut 90 holds the inner race in place. A nut 91 holds a spring abutment 106 in place, the nuts 90 and 91 being held by a lock washer 91'. The drive shaft 84 is illustrated as being loosely connected by its rear end to a beveled pinion gear 93 or other suitable drive which actuates the differential on the rear axle of the automobile. This gear is journaled in an antifriction bearing 94 mounted in the ring 95 on the forward part of the differential housing. The shaft 84 is provided with splines 96 which cooperate with splines on the inner tube 97 of a tubular clutch designated generally by the numeral 98, this having an outer sleeve 99. The member 97 has a rearward taper 100 which fits in the tapered socket 101 of the gear 93; and the member 97 also has clutch jaws 102 which engage with complementary clutch jaws 103 on the clutch member 104 secured to the pinion gear 93. The main clutch is urged into engagement with the pinion gear by a spring 105 which bears against an abutment 106 on the nut 91 at the open end of the outer clutch sleeve 99. The clutch is shifted in a manner hereunder set forth.

A forward helical gear 107 is journaled on the ring 108 screw threaded in the cylindrical portion 109 of the clutch and gear case I, this ring bearing against the inwardly extending shoulder 110. The opposite side of the gear is supported on the ring 111 fitted in the cylindrical portion 109, there being preferably roller bearings 112 supporting the gear. This gear meshes with the helical gear 72 for raising and lowering the parking wheels.

This gear 107 has clutch jaws 113 which engage with the complementary clutch jaws 114 on the forward end of the sleeve 99 of the main clutch 98. The gear also has at its rearward end clutch jaws 115 which may be engaged by the sliding clutch sleeve 116 on the cylindrical sleeve 99, this having forward jaws 117.

The drive to the helical gear 77 operating the transverse shaft M for lateral translation of the vehicle is by the gear 118 which is supported by roller bearings 119 on the ring 120 threaded in the cylindrical portion 109 of the clutch and gear casing I and also on the ring 121 fitted therein. This gear has clutch jaws 122 which are engaged by the complementary clutch jaws 123 on the rear end of the sliding clutch sleeve 116.

The manipulator lever with the parts associated therewith is substantially as follows, having reference particularly to Figs. 1, 2, 3, 4, 11, 12, 13, 14 and 15:

Referring first to the construction of Figs. 11, 12 and 13, this shows the manipulator shifting box 124 which may be located in any suitable position in the vehicle. This box has openings at the front and the back with clutch shifting rods 125 and 126 therein. These rods have their forward ends sliding in closed guide tubes 127. The rod 125 is shown with a yoke 128 which is U-shaped in plan and tapered downwardly having a contracted throat 129. At the bottom of each side of the opening 130 of the yoke there are a pair of depending lugs 131 which are tapered inwardly as indicated at 132. These tapered lugs are adapted to be engaged by a plunger 133 mounted in a plug-like socket 134 and having a compression spring 135. The plunger 133 is adapted to hold the rod 125 in a neutral position with the opening 130 centrally positioned. The rod 126 has a yoke 136 which is substantially the same shape as the yoke 128, but there are no depending lugs on the bottom.

The manipulator lever designated in the general description by the letter N has a handle 137 with a knob on the top and has a ball 138 fitting on a lower ball seat 139 and having an upper ball seat 140 on the top of the box 124. There is a dome-shaped dust cover 141 secured to the handle above the ball. The lower portion 142 of the manipulator lever has an operating end 143 which is in side elevation shaped like a gear tooth as indicated at 144, and at the bottom has an angularly positioned finger 145 adapted to engage the plunger 133 and thrust this plunger outwardly from between the lugs 131. The handle 137 may be rocked on the ball and when both of the rods 125 and 126 are in their neutral position the operating end 143 may be shifted into the openings of the yokes 128 and 136. By rocking this lever it will be manifest that either rod 125 or 126 may be shifted in a longitudinal direction.

In order to require stoppage of a car before the parking mechanism can be brought into position I have a transverse rock shaft 146 journaled in opposite sides of the box 124. An arm 147 is connected to this rock shaft and also by a suitable connection is hooked up with the emergency or parking brake. A finger 148 is secured to the rock shaft in the center of the housing and is positioned to have the nose engage the lower portion 142 of the manipulator hand lever and prevent this from operation when the hand brakes are loose, being in the dotted line position shown in Fig. 12, or shiftable to the full line position as shown in Fig. 12, allowing the full operation of the manipulator hand lever. Therefore, the hand brake must be applied before the manipulator lever can be actuated in any manner, but the driver is at liberty to apply the hand brake and leave the manipulator lever in its ordinary position when the car is running. The manner of shifting the lever is detailed hereunder.

Referring to Figs. 1 and 2 the rod 125 is connected to a rocking shaft 149 which passes through a rocking tube 150, these being mounted in a suitable manner on the vehicle and having rock arms 151 and 152 connecting from the rods 125 and 126 to the shaft and the tube respectively. A link 153 is connected by a short rock arm 154 to the rocking tube and a link 155 is connected by a short rocking arm 156 to the rocking shaft 149. Therefore, it will be seen that the link 155 and the rod 125 are interconnected so that these operate together in the same direction, and the rod 126 and the link 153 are interconnected to operate simultaneously in the same direction.

Referring particularly to Figs. 3, 4 and 14, the link 155 is connected to the inner yoke designated generally by the numeral 157 and the link 153 is connected to the outer yoke designated generally by the numeral 158, these being attached by eyes to the upper rods 159 and 160, respectively, of these yokes. The yokes are journaled on a common fulcrum pin 161 in the lower part of the main clutch and gear case I, the outer yoke having side arms 162 and the inner yoke side arms 163 on opposite sides of the clutch and gear case I.

The connections of the inner and outer yokes 157 and 158 to the clutches in the clutch and gear case I are substantially as follows, having reference particularly to Figs. 3, 4 and 6:

A clutch ring 164 in the form of a split ring having clamping bolts 165 (Fig. 14) fits in a grooved ring 166 secured at the rearward end of the outer sleeve 99 of the main clutch mechanism. A stud 167 extends outwardly from this ring and has a squared section 168 with a plate 169 outside, and this plate having inwardly extending flanges 170. The plate and the squared part of the stud slide in a slot 171 in the side walls of the main clutch and gear case I. The plate forms a dust and dirt proof fitting and also prevents the stud 167 from coming loose. The outer end 172 of the stud operates in a slot 173 in the arms 163 of the inner yoke, this having a bushing 174 to prevent wear. Therefore, on movement of the inner yoke the clutch ring 164 shifts the clutch jaws 102 out of engagement with the clutch jaws 103 and therefore releases the propeller shaft from driving the vehicle through the medium of the differential pinion.

In Fig. 6 this main clutch is illustrated as being in a neutral position. When the inner yoke is pulled forwardly to its limit it shifts the main clutch having the outer sleeve 99 forwardly so that the clutch jaws 114 thereon engage with the clutch jaws 113 of the helical gear 107. This allows the propeller shaft to drive the gear 72 and hence operate the screw jack mechanism for lowering the parking wheels and raising the vehicle.

When the vehicle is fully raised or lowered a kick-out mechanism substantially as follows throws out the clutch. This is illustrated more particularly in Figs. 5, 6 and 14. A rocking segment 175 is mounted on a pivot pin 176 on the forward end of the hanger 73. This is connected by a link 175ª to an arm 175ᵇ, this latter forming a forward extension of the rearward parking leg on the side of the vehicle. The segment 175 has an adjustable set screw 177 which engages the downwardly extending end 178 of the bell crank 179 mounted on the clutch and gear case I. The arm 180 of this bell crank has a loose connection with a link 181 which extends rearwardly along the side of the clutch and gear case I, the rear end connecting to one of the arms 163 of the inner yoke 157 as indicated at 182. Therefore, when the parking wheels are fully lowered and the vehicle fully elevated the inner yoke 157 is shifted rearwardly thus shifting the inner sleeve 99 and opening the clutch having the jaws 113 on the helical gear 107, and the jaws 114 on the sleeve 99.

The sliding clutch sleeve 116 is interlinked with the outer yoke 158 in the following manner, having reference particularly to Figs. 3, 4, 6 and 14: A split ring 183 having clamping bolts 184 (note Fig. 14) has lateral bosses 185 in which is fitted a pin 186. This pin has a square block 187 fitted thereon and a plate 188 sliding in a slot and a recess 189 in the side of the clutch and gear case I. The outer end of the pin is connected to links 190 which by means of the pivot pins 191 are attached to the side arms 162 of the outer yoke 158. By this means when the yoke 158 is moved rearwardly the clutch sleeve 116 slides rearwardly on the sleeve 99 (note Fig. 6) bringing the clutch jaws 123 into engagement with the complementary jaws 122 on the helical gear 118; then by rotation of the propeller shaft 84 in the proper direction this gear is rotated through the medium of the splines 119 and rotates the transverse shaft M (Fig. 8) through the medium of the helical gear 77. This, therefore, operates the friction wheels on the right hand side of the vehicle, giving motion to the parking wheels and shifting the vehicle laterally to the side desired by the operator. After parking the vehicle may be shifted in an opposite direction by having the same clutch jaws in engagement and operating the propeller shaft in the opposite direction to that giving the first transverse movement.

The action of lowering the vehicle and raising the parking wheels is by shifting the outer yoke forwardly which, through the medium of the links 190, moves the clutch sleeve 116 so that the clutch jaws 117 on the forward end thereof engage the clutch jaws 115 on the rear edge of the helical gear 107. This action is necessary as the main clutch having the jaws 114 on its forward end to engage in the complementary jaws 113 on the gear 107 are in neutral position and are maintained in this position by the segment 175 being tilted to the left as illustrated in Figs. 5 and 14.

With the jaws 115 and 117 in engagement the helical gear 107 can be driven in the proper direction by the propeller shaft to raise the parking wheels through the medium of the screw jack device H, this motion being the reverse of that for lowering the parking wheels. The clutch members 113 and 114 are so shaped that they are operative only when the propeller shaft is being driven in the direction of reverse motion, while the clutch members 115 and 117 are shaped so as to operate when the propeller shaft is turning in the forward direction of motion.

As the parking wheels are raised there is a thrust on the link 175ª tilting the segment 175 from the position illustrated in Figs. 5 and 14 to the dotted line position shown in Fig. 5. This brings the set screw 192 into engagement with the downwardly depending end 193 of the bell crank 194 which is pivotally mounted on the outside of the clutch and gear case I. The set screws 177 and 192 are offset so that they will respectively clear these downwardly extending ends 193 and 178 in their rocking motion as indicated in Figs. 5 and 14. The arm 195 of the bell crank 194 is loosely connected to a link 196 which is pivotally connected to the arm 162 of the outer yoke 158 on the left hand side of the vehicle, the connection being by the pivot pin 197. Therefore, when the parking wheels are fully raised the outer yoke 158 is moved rearwardly thus carrying the clutch sleeve 116 by the links 190 so that the clutch jaws 117 on the sleeve are free from the complementary jaws 115 on the helical gear 107; thus stopping the upward movement of the legs carrying the parking wheels and allowing free rotation of the propeller shaft until the operator either shuts off the engine or moves the transmission into neutral or throws out the main engine clutch.

The outer yoke 158 is held in neutral position as follows: A pair of pins 198 are secured to the forward end of the plates 188 on opposite sides of the clutch and gear case I and have rods 199 connected thereto. These rods may reciprocate in tubular spring housings 200 having two springs 201 and 202 therein, there being a head 203 on the end of the rod engaging the ends of the springs. These springs are of equal strength and function to hold the outer yoke in a position so that the clutches operated thereby are in a neutral position.

The action of the manipulator lever N combined with the gear shift lever of the vehicle is substantially as follows, having reference particularly to Fig. 15: The upper diagram in this figure represents a plan view of the manipulator lever N showing the different angular positions occupied by the hand lever 137. The lower set of diagrams shows the positions of the ordinary gear shift lever of the vehicle, presuming this to be the standard gear shift. The left hand end of the diagram represents the rear of the vehicle and the right hand end the forward end of the vehicle. There are five small diagrams representing the relative positions of the manipulator lever, and of the gear shift lever. The right hand diagrams represented by the numeral 204 show the manipulator lever with the knob in the R or running position. This position thrusts the rod 125 rearwardly and also the link 155 moving the inner yoke 157 to its rearwardmost position and thereby connecting the propeller shaft with the vehicle differential for driving the vehicle. The gear shift diagram 205 represents the gear shift lever in the neutral position in which it may be moved in any of the gear shift positions. The diagrams 204 and 205 are designated normal running positions. The diagrams 206 and 207 of the manipulator and gear shift lever respectively represent the positions in raising the car. In this action the knob of the manipulator lever is shifted rearwardly in a straight line and hence moves the rod 125 and the link 155 forwardly thus moving the inner yoke to its forwardmost position and closing the clutch having the jaws 113 and 114 between the sleeve 99 and the helical gear 107. The gear shift lever is indicated as being moved to the reverse movement position, which position rotates the propeller shaft in the proper direction to cause the lowering of the parking wheels and thus the raising of the vehicle.

The diagrams 208 and 209 represent the position of the levers for translation to the right on the parking wheels. The manipulator lever has been automatically shifted to the neutral position when the parking wheels are fully raised through the action of the shifting segment 175 and the link 181 moving the inner yoke 157 rearwardly into its neutral position, and is then held in neutral by the lug 131. The manipulator lever is then moved into its second position causing the lower end 143 thereof to engage in the yoke 136 of the rod 126. This action throws the rod 126 rearwardly, thus moving the link 154 rearwardly and the outer yoke 158 rearwardly. Such movement of the outer yoke brings the clutch jaws 122 and 123 into engagement, thus connecting the helical gear 118 with the propeller shaft. The gear shift lever is left in the reverse drive position and this drive is designed to rotate the transverse shaft M in such a direction as to move the vehicle in a translation to the right. This is the direction required for the ordinary parking against the curb.

Diagrams 210 and 211 show the position for translation to the left. In this case the manipulator lever is left in its second position with all the parts connected thereto and to the outer yoke in the position designated by the translation to the right, and the gear shift lever is shifted to the Number 1 or the low speed forward position. This rotates the propeller shaft in the direction for forward travel of the vehicle and actuates the transverse shaft M in a direction for translation of the vehicle on the parking wheels to the left.

Diagrams 212 and 213 illustrate the relative position for lowering the car; that is for raising the parking wheels. The manipulator lever is shifted from the Number 2 to the Number 3 position which may be done by a straight line movement of the knob rearwardly and this shifts the rod 126 and the link 153 forwardly, thus moving the outer yoke 158 to its forward position and engaging the clutch jaws 117 and 115, thus connecting the helical gear 107 with the propeller shaft. This shaft is operated by the low gear transmission of the vehicle rotating in a direction for forward travel and thus operating the screw jack device H in a manner to raise the parking wheels, thus lowering the car onto the parking wheels. When the parking wheels are fully elevated the outer yoke is shifted to the neutral position by means of the rocking segment 175 and the link 196 acting through the bell crank 194, thus disengaging the helical gear 107 from the propeller shaft. It will be apparent that other standard gear shifts may be used to drive the propeller shaft and also if the vehicle is steam or electrically operated and has no gear shifts that the desired direction of rotation may be given to the propeller shaft in any desired manner.

It is desirable to positively latch the parking wheels in their uppermost position and this is done by a latch mechanism indicated in Fig. 4. The universal joint housings 214 connected to the gear 72 and enclosing the universal joints 71 are rotatable with the gear 72 (note Fig. 7) and have ratchet teeth 215 on their periphery. A pawl 216 mounted on a pivot pin 217 on one side of the clutch and gear case I is acted upon by a spring 218 to normally move the tooth of the pawl into engagement with the teeth 215. This action takes place when the parking wheels are fully raised and the manipulator lever is in the position for ordinary running of the vehicle; that is with the inner yoke in its rearwardmost position and the outer yoke in its neutral position. A pin 219 is connected to the link 181, and in the forward motion of the link the pin engages the upper end of the pawl 216 and disengages this from the ratchet teeth 215 on the universal joint housings 214, thus allowing rotation of said joints and hence the raising and lowering of the parking wheels. A flexible oil confining cover 220 is connected between the universal joint housings 214 and the nut 70.

A brake is provided for the transverse movement shaft M shown particularly in Figs. 4 and 8 in which the cylindrical part 221 of the dust cover 78 for the universal joint 74 forms a brake drum which is engaged by a brake band 222. This band, as illustrated in Fig. 4, has one end secured to a pivot pin 223 mounted on the side of the hanger 73. A brake lever 224 has a pivotal connection to the other end 225 of the brake band and this lever is operated by a link 226 which is adapted to connect to the standard brakes, that is the foot operated brakes of the vehicle, whereby by depressing the ordinary foot brake pedal a braking action may be applied to the dust cover 78, hence to the universal joint 74 restraining the rotation of the transverse shaft M and thus stopping the movement of translation of the vehicle laterally.

In order to maintain a tight contact between the friction wheels and the parking wheels the axle 49 is made eccentric to the hub 48 (note Figs. 9 and 16) so that when pressure is brought to bear on the parking wheels on their engagement with the ground the tendency is to shift the eccentric axle upwardly, thus forcing the tire of the parking wheels into close engagement with the driving periphery of the friction drive wheels K and L. This provision also acts to compensate for wear of the tires on the friction wheels.

The main housing I, principally for purposes of assembly, is made substantially as follows: The main cylindrical construction may be designated by the numeral 227, having a flange 228 at the rear end bolted or otherwise secured to the differential housing. The ring 95 is screw threaded at the rear end of the structure 227. The forward end has the inwardly extending shoulder 110. An assembly sleeve 229 is mounted in the clutch and gear casing I. The gears 107 and 118 and gear 118 mounted on the antifriction bearings are supported on this internal assembly sleeve 229, which makes for simplicity of assembly. (Note Fig. 6.) It will be manifest that both the inner and outer structure require openings for the bosses of the clutch rings to pass outwardly; and also at the bottom openings are required for the helical gears used to drive the screw jack device H and also the transverse movement shaft. The details of the mounting of the springs 201 and 202 for centralizing the outer yoke in its usual position utilizes a ring 230 held centrally in the spring housings 200 by a set screw 231 or the like; and each of the springs bears against a washer type of device 232. The spring 201 bears against a closure head 233 having a guide 234 for the rod 199, the other spring 202 bearing against a closure plug 235. By this construction the springs are limited in their motion and when the head 203 is thrust either way from the central position only one spring can bear against this head, thus quickly tending to centralize the position of the outer yoke; and when in the central position the two springs being on opposite sides of the ring 230 hold the yoke in this neutral position.

From the above description, together with the drawings, it will be seen that a characteristic feature of my invention is in the use of the torsion shafts extending between the front and rear axle and having the parking wheels connected thereto by legs; and in which by partially rotating these torsion shafts the parking wheels are caused to lower or be elevated, thus raising and lowering the running wheels of the vehicle. In conjunction with this I employ the feature of having the friction drive on the parking wheels at one side of the vehicle and in which one of the friction drive wheels is rotatably mounted on the torsion tube on one side. The friction drive to the other parking wheel is by means of a drive shaft which extends longitudinally through the torsion tube and both of these friction wheels are driven through the same mechanism. While I have shown the power mechanism for these operations as being derived from the propeller shaft of the vehicle, it will be understood that other means can be employed.

Another feature of my invention includes the clutches and gear arrangements by which the propeller shaft may be connected to drive the rear axle or through the screw jack device lower and raise the parking wheels; and also that when these wheels are at their extreme lowermost position or uppermost their clutch connections to the propeller shaft are open. In addition, the propeller shaft may be connected to drive the friction wheels in the desired direction for lateral movement.

My arrangement for controlling the clutches is by the simple expedient of using a manipulator lever operating in practically the same motions as the ordinary gear shift lever of the vehicle; and by this manipulator lever operating on either of two rods selectively the various clutches may be operated and, therefore, this lever acting in conjunction with the gear shift lever allows the operation of the parking wheels for raising and lowering the vehicle and for the transverse movement deriving power from the propeller shaft.

The feature of using the manipulator lever N in cooperation with the ordinary gear shift lever simplifies the construction and operation, in that the gear shift lever with the gear shift mechanism operated thereby is standard equipment on most motor vehicles and the manipulator lever is operated by a substantially same type of motion. Moreover, this manipulator lever is only called upon to control the clutches connecting the propeller shaft for raising and lowering the parking wheels or for the transverse movement of the vehicle and, in addition, has the function of connecting the propeller shaft for the rear axle drive.

In raising the car or in causing the same to move sideways to the right the ordinary transmission lever is put in reverse; in lowering the car in moving it to the left the transmission lever is put in low.

It is necessary that the worm 60 in meshing with the gear 59 for operating the friction wheels be of coarse pitch so that a back motion given to the friction wheels when the parking wheels engage with the ground or disengage therefrom on the raising or lowering of the vehicle be communicated to the shaft M, the universal joint 74, the helical gear 77, and the gear 118 which is free to rotate.

An important feature of my invention is in the drive to the differential. The pinion 93 has a rotating fit on the end 236 of the propeller shaft (note Fig. 6) and is held in place by a nut 237 having lock washers. A shoulder 238 is formed on the end of the slightly enlarged section 239 and has friction washers 240 bearing against such shoulder and engaging the forward end of the pinion 93. When the main clutch having the clutch jaws 102 is moved rearwardly so that these jaws engage with the complementary jaws 103 the wedge structures of slight taper 100 and 101 are brought into contact, this contact being held tight by the main spring 105. This wedge action insures a tight taper fit of the pinion 93 on the propeller shaft, the spring taking up any slight wear; and it is to be noted, as above described, that the clutch jaws 102 and 103 are only called upon to transmit rotary motion. Also there can be no slippage between the wedge structures 100 and 101 when the vehicle is in motion.

Various changes may be made in the principles of my invention without departing from the spirit thereof, as set forth in the description, drawings and claims.

I claim:

1. A parking device for motor vehicles comprising in combination a vehicle frame, a pair of front and rear legs each having parking wheels at the lower end pivotally connected to the vehicle frame adjacent the front and rear end thereof, means to operate said legs to lower and raise said wheels thereby raising and lowering the running wheels of the vehicle, means forming a friction drive with one of said wheels on one side at one end and a shaft having a friction drive to one of the wheels at the other end of the vehicle, and means to operate said friction drives to move the vehicle transversely.

2. A parking device for motor vehicles comprising in combination a pair of longitudinal shafts connected to the front and rear portions of the vehicle, one of said shafts being tubular, legs connected to each of said shafts having parking wheels thereon at the front and rear portions of said shafts, means to operate said shafts to lower and raise the parking wheels, a drive wheel rotatably mounted on the tubular shaft and having a drive connection with one of the parking wheels adjacent one end of the tubular shaft, a shaft extending through the tubular shaft and having a driving wheel at the end with a connection to the other parking wheel mounted on the tubular shaft, and means to drive the first mentioned driving wheel and the shaft extending through the tubular shaft to operate the driving wheels to move the vehicle transversely.

3. A parking device for motor vehicles comprising in combination a pair of longitudinal shafts extending from the front to the back of the vehicle, one of said shafts being tubular, legs connected to each of said shafts and having a parking wheel at the bottom, means to operate said shafts to lower and raise the parking wheels, a friction wheel rotatably mounted on the tubular shaft and engaging one of the parking wheels on such tubular shaft, a drive shaft extending through the tubular shaft and having a friction wheel thereon engaging the other parking wheel on the tubular shaft, means to operate the first mentioned friction wheel and the shaft connected to the second mentioned friction wheel thereby operating the friction wheels to move the vehicle transversely.

4. A parking device for motor vehicles comprising in combination a propeller shaft for such vehicle having a drive connection to one of the axles, a plurality of sets of parking wheels interconnected to the frame of the vehicle adjacent the front and rear, a screw jack type of device connected with the parking wheels on opposite sides of the propeller shaft, means to engage the propeller shaft with the drive to the axle and to disengage same, and means to connect the propeller shaft to the screw jack devices whereby the parking wheels may be lowered or raised at the front and rear of the vehicle.

5. A parking device as claimed in claim 4, friction wheels having a drive connection with the parking wheels on one side of the vehicle, and means to drive said friction wheels from the propeller shaft.

6. A parking device for motor vehicles comprising in combination a propeller shaft having a drive connection to one of the axles of the vehicle, a pair of torsion shafts extending longitudinally of the vehicle on opposite sides of the propeller shaft, legs having parking wheels connected to the torsion shafts, a pair of screw jack devices connected to the torsion shafts on opposite sides of the vehicle, a geared connection from the screw jack devices to the propeller shaft, a clutch to engage the propeller shaft to the axle drive and to disengage same, a second clutch to engage the propeller shaft to the gear drive for the screw jack devices whereby the parking wheels may be lowered or raised, and means to disengage the drive to the screw jack devices on the complete lowering or raising of the parking wheels.

7. A parking device as claimed in claim 6, a friction wheel mounted on one of the torsion shafts and having a drive through a transverse shaft to a geared connection to the propeller shaft, said latter connection having a clutch whereby on operation of the propeller shaft the vehicle may be moved transversely.

8. A parking device as claimed in claim 6, one of the torsion shafts being hollow and having a first friction wheel rotatably mounted on the outside thereof and a second friction wheel mounted on an internal shaft extending through the hollow torsion shaft, said friction wheels engaging the parking wheels on the same side of the vehicle, and a drive connection for the first parking wheel and the said internal shaft from the propeller shaft.

9. A parking device for motor vehicles comprising in combination a propeller shaft having a drive connection with one of the axles of the vehicle, a plurality of parking wheels arranged in pairs on opposite sides of the propeller shaft, a pair of clutch operating rods having a manipulator lever to selectively engage therewith, a plurality of clutches on the propeller shaft actuated by said rods, means to operate said manipulator lever to connect the propeller shaft with a drive to the axle and to disengage same and to connect the propeller shaft with means to lower and raise the parking wheels, and means independent of said manipulator lever to rotate the propeller shaft in the desired direction.

10. A parking device as claimed in claim 9, means interconnected between the parking wheels and one of the clutches to disengage said clutches on the complete lowering or raising of the parking wheels, and an additional clutch operated by the manipulator lever to engage the propeller shaft with a drive to the parking wheels to give a transverse motion to the vehicle.

11. A parking device for motor vehicles comprising in combination a pair of tubular torsion members carried by the vehicles, a pair of rigid legs fixed to each of said torsion members, a separate axle carried by the outer swinging end of each leg, a parking wheel mounted on each of said axles, means for simultaneously rotating said tubular members in either direction by the power of the vehicle to swing the legs and thus raise or lower the vehicle, an axle mounted concentrically with one of the tubular members, a pair of friction wheels connected to said axle, means for producing a forcible engagement between each friction wheel and a mating parking wheel, and means for rotating said axle to turn the friction wheels and hence the parking wheels and thereby move the vehicle sideways in either direction by the power of the vehicle.

12. A parking device for motor vehicles comprising in combination with such vehicle a pair of tubular torsion members carried thereby, a pair of rigid legs fixed to each of said torsion members each leg having a separate axle on which is mounted a parking wheel, an axle for moving the vehicle sideways mounted concentric with one of the tubular torsion members and carrying friction wheels arranged to engage parking wheels carried by the torsion member having the concentric axle, means for effecting a disconnection between the propeller shaft of the vehicle and the driving wheels to permit use of the propeller shaft of the vehicle and the transmission gearing of such vehicle to operate a train of gearing for rotating said torsion members to raise or lower the vehicle, and for rotating said axle to move the vehicle sideways in either direction without rotating the driving wheels of the vehicle.

13. In a parking device for motor vehicles having means to raise the vehicle on parking wheels, means to move the vehicle transversely on such wheels, a manipulator device to selectively control the raising of the vehicle and the transverse motion, and means interconnected between the manipulator device and the emergency or parking brake of the vehicle whereby the parking brake must be set before said manipulator device can be actuated to raise the vehicle or to move the vehicle transversely.

14. In a parking device for motor vehicles, means to raise the vehicle on parking wheels and means to move the vehicle laterally on such wheels, a manipulator control lever having an interconnection with the propeller shaft of the vehicle to connect such shaft with the raising means and with the transverse motion means, and a vehicle gear shift co-acting therewith to rotate the propeller shaft in the desired direction for raising the vehicle and for transmitting power for translation laterally of the vehicle.

15. A parking device for motor vehicles, comprising in combination a vehicle frame, a plurality of sets of parking wheels adjacent the front and rear end on opposite sides of the vehicle, said parking wheels being interconnected with the said frame, means to lower and raise said parking wheels to raise the running wheels above the ground and to lower same to the ground, and a friction drive device for operating at least one of the parking wheels adjacent the front and rear of the vehicle to effect transverse motion.

16. A parking device for motor vehicles, comprising in combination a vehicle frame, a plurality of sets of parking wheels, one set being adjacent the front and the other adjacent the rear of the vehicle, at least one of said sets having a wheel on each side of the vehicle, the parking wheels being interconnected with the frame, means to lower and raise said parking wheels to raise the vehicle above the ground and to lower same, and a friction drive device operatively engaging at least one of the parking wheels at the rear and one at the front to effect transverse movement of the vehicle.

17. A parking device for motor vehicles, comprising in combination a vehicle frame, pivotally mounted parking wheels connected to said frame, there being a rear set and a front set, means to actuate said wheels to raise the vehicle with the running wheels above the ground, and a drive having friction means engaging at least one of the parking wheels at the front and the rear of the vehicle for transverse movement of the vehicle.

18. A parking device for motor vehicles comprising in combination a vehicle frame having running wheels, a plurality of parking wheels interconnected to said frame, means to lower and raise said parking wheels to raise the running wheels above the ground and to lower same to the ground, and a drive device independent of the running wheels frictionally engaging at least one of the parking wheels to effect transverse motion.

19. A parking device for motor vehicles, comprising in combination a vehicle frame having wheels, a plurality of parking wheels interconnected to said frame, means to lower and raise said parking wheels to raise the vehicle wheels above the ground and to lower same and a drive device independent of the vehicle wheels, frictionally engaging at least one of the parking wheels to effect transverse movement of the vehicle.

20. A parking device for motor vehicles comprising in combination a vehicle frame having running wheels, pivotally mounted parking wheels connected to said frame, means to actuate said wheels to raise the vehicle with the main running wheels above the ground and a drive having friction means independent of the vehicle wheels engaging at least one of the parking wheels for transverse movement of the vehicle.

21. A parking device for motor vehicles comprising in combination a vehicle frame having running wheels, pivotally mounted parking wheels interconnected to said frame with means to lower and raise said parking wheels to raise and lower the running wheels of the vehicle, and a friction drive independent of the vehicle wheels engaging the tread of at least one of the parking wheels to effect transverse motion of the vehicle.

In testimony whereof I have signed my name to this specification.

GEORGE W. WOOLLEY.